(12) United States Patent
Kuno et al.

(10) Patent No.: US 12,241,694 B2
(45) Date of Patent: Mar. 4, 2025

(54) HEAT EXCHANGE MEMBER, HEAT EXCHANGER USING HEAT EXCHANGE MEMBER, AND METHOD OF MANUFACTURING HEAT EXCHANGE MEMBER

(71) Applicant: NGK Insulators, Ltd., Nagoya (JP)

(72) Inventors: Shuhei Kuno, Komaki (JP); Satoshi Nagamoto, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 247 days.

(21) Appl. No.: 17/821,239

(22) Filed: Aug. 22, 2022

(65) Prior Publication Data

US 2022/0390180 A1    Dec. 8, 2022

Related U.S. Application Data

(63) Continuation of application No. PCT/JP2021/047956, filed on Dec. 23, 2021.

(30) Foreign Application Priority Data

Mar. 11, 2021    (JP) .................... 2021-038879

(51) Int. Cl.
*F28D 7/10* (2006.01)
*F28F 1/40* (2006.01)
*F28F 21/04* (2006.01)

(52) U.S. Cl.
CPC ............... *F28D 7/106* (2013.01); *F28F 1/40* (2013.01); *F28F 21/04* (2013.01)

(58) Field of Classification Search
CPC ... F28D 7/106; F28F 1/40; F28F 21/04; F28F 13/003; F01N 2240/02
See application file for complete search history.

(56) References Cited

U.S. PATENT DOCUMENTS

2002/0117773 A1    8/2002   Yamada et al.
2014/0102683 A1*   4/2014   Kawaguchi ............. F28D 15/00
                                                        165/165
(Continued)

FOREIGN PATENT DOCUMENTS

JP    2000-188426 A    7/2000
JP    2002-321210 A    11/2002
(Continued)

OTHER PUBLICATIONS

Pdf is translation of foreign reference JP-2004255377-A (Year: 2004).*

(Continued)

*Primary Examiner* — Henry T Crenshaw
*Assistant Examiner* — Kamran Tavakoldavani
(74) *Attorney, Agent, or Firm* — BURR PATENT LAW, PLLC (57) ABSTRACT

A heat exchange member including: a honeycomb structure body including: partition walls extending from a first end surface to a second end surface to define cells forming flow passages for a first fluid; and an outer peripheral wall; and a covering member configured to cover the outer peripheral wall of the honeycomb structure body. The partition walls and the outer peripheral wall contain ceramic as a main component, and the outer peripheral wall surface has a peak count RPc according to JIS B 0601:2013 set to 55 pks/cm or larger.

18 Claims, 4 Drawing Sheets

(56) References Cited

U.S. PATENT DOCUMENTS

| | | | |
|---|---|---|---|
| 2015/0292812 A1 | 10/2015 | Tomita et al. | |
| 2018/0211855 A1 | 7/2018 | Yamamoto et al. | |
| 2018/0230884 A1 | 8/2018 | Kawaguchi et al. | |
| 2019/0204031 A1 | 7/2019 | Kawaguchi et al. | |
| 2019/0277570 A1* | 9/2019 | Kawaguchi | F28F 21/04 |
| 2020/0309463 A1 | 10/2020 | Yoshihara et al. | |

FOREIGN PATENT DOCUMENTS

| | | | |
|---|---|---|---|
| JP | 2004255377 A * | 9/2004 | |
| JP | 2012-037165 A | 2/2012 | |
| JP | 6075381 B2 | 2/2017 | |
| JP | 2018-120891 A | 8/2018 | |
| JP | 2018-159503 A | 10/2018 | |
| JP | 2019-120488 A | 7/2019 | |
| JP | 2020-159270 A | 10/2020 | |
| WO | 2017/069265 A1 | 4/2017 | |
| WO | 2019/135312 A1 | 7/2019 | |

OTHER PUBLICATIONS

English translation of the International Preliminary Report on Patentability (Chapter I) dated Sep. 21, 2023 (Application No. PCT/JP2021/047956).

English translation of the International Search Report dated Feb. 1, 2022 (Application No. PCT/JP2021/047956).

International Search Report and Written Opinion (Application No. PCT/JP2021/047956) dated Feb. 1, 2022.

* cited by examiner

HEAT EXCHANGE MEMBER, HEAT EXCHANGER USING HEAT EXCHANGE MEMBER, AND METHOD OF MANUFACTURING HEAT EXCHANGE MEMBER

CROSS-REFERENCE TO RELATED APPLICATIONS

This application is a continuation under 35 U.S.C. 120 of International Application PCT/JP2021/047956 having the International Filing Date of Dec. 23, 2021, and having the benefit of the earlier filing date of Japanese Application No. 2021-038879, filed on Mar. 11, 2021. Each of the identified applications is fully incorporated herein by reference.

BACKGROUND OF THE INVENTION

Technical Field

The present invention relates to a heat exchange member, a heat exchanger using the heat exchange member, and a method of manufacturing the heat exchange member.

Background Art

In recent years, improvements in fuel efficiency of automobiles have been demanded. In particular, in order to prevent reduction in fuel efficiency when an engine is cold, for example, at engine start, a system that reduces friction loss is expected. The system quickly heats, for example, cooling water, engine oil, and an automatic transmission fluid (ATF) so as to reduce friction loss. Further, a system that heats a catalyst for purifying an exhaust gas so as to quickly activate the catalyst is also expected.

In such systems, the use of, for example, a heat exchanger has been considered. The heat exchanger is a device including a heat exchange member. The heat exchange member causes a first fluid to flow inside and a second fluid to flow outside so as to allow heat exchange between the first fluid and the second fluid. Such a heat exchanger allows efficient use of heat through heat exchange between, for example, the first fluid having a high temperature (for example, an exhaust gas) and the second fluid having a low temperature (for example, cooling water). As a heat exchanger that recovers heat from a high-temperature gas such as an exhaust gas emitted from an automobile, the development of the following heat exchanger has been promoted in recent years. The heat exchanger includes a heat exchange member having a columnar honeycomb structure body housed inside a frame (casing). The heat exchanger causes the first fluid to flow through cells of the honeycomb structure body and the second fluid to flow over an outer peripheral surface of the heat exchange member inside the casing. As the heat exchange member having a honeycomb structure body, a heat exchange body having a columnar honeycomb structure body including first partition walls and second partition walls has been proposed (Patent Literature 1). The first partition walls extend in a radial direction from a center of a cross section of the heat exchange body, which is perpendicular to a direction in which flow passages for the first fluid extend (direction in which the cells extend), toward an outer peripheral portion. The second partition walls extend in a circumferential direction. Further, a heat exchange member having a hollow (donut-shaped) columnar honeycomb structure body has also been proposed (Patent Literature 2). The heat exchange member includes a hollow region functioning as a bypass passage for an exhaust gas. A heat exchange member having such a columnar honeycomb structure body is significantly useful. Meanwhile, further improvement of heat exchange performance has been continuously demanded.

CITATION LIST

Patent Literature

[PTL 1] JP 6075381 B2
[PTL 2] WO 2017/069265 A1

SUMMARY OF THE INVENTION

A main object of the present invention is to provide a heat exchange member having excellent heat exchange performance. Another object of the present invention is to provide a heat exchanger using the heat exchange member and a method of manufacturing the heat exchange member.

According to one embodiment of the present invention, there is provided a heat exchange member, including: a honeycomb structure body including: partition walls extending from a first end surface to a second end surface to define cells forming flow passages for a first fluid; and an outer peripheral wall; and a covering member configured to cover the outer peripheral wall of the honeycomb structure body. The partition walls and the outer peripheral wall contain ceramic as a main component, and the outer peripheral wall surface has a peak count RPc according to JIS B 0601:2013 set to 55 pks/cm or larger.

In one embodiment, the covering member has an inner peripheral surface with a peak count RPc set to 45 pks/cm or larger.

In one embodiment, the outer peripheral wall surface has a maximum height of profile Rt according to JIS B 0601: 2013 set to 75 μm or smaller.

In one embodiment, the partition walls and the outer peripheral wall are made of ceramic containing silicon carbide as a main component.

In one embodiment, the cells of the honeycomb structure body are arranged without any space inside the outer peripheral wall when the honeycomb structure body is viewed in cross section perpendicular to a direction in which the flow passages for the first fluid extend. In another embodiment, the honeycomb structure body has a hollow region in a center of the cross section perpendicular to the direction in which the flow passages for the first fluid extend.

According to another aspect of the present invention, there is provided a heat exchanger. The heat exchanger includes: the heat exchange member; and an outer cylinder provided on an outer side of the heat exchange member so as to be apart from the heat exchange member, and a flow passage for a second fluid is defined between the outer cylinder and the covering member of the heat exchange member.

According to still another aspect of the present invention, there is provided a method of manufacturing a heat exchange member. This manufacturing method includes cutting the outer peripheral wall surface at a circumferential speed of 3.0 m/second or higher with use of a grindstone having a grit size of 90 or finer and a diameter of 20 mm or larger.

Advantageous Effects of Invention

According to embodiments of the present invention, the heat exchange member having excellent heat exchange performance can be achieved.

DETAILED DESCRIPTION OF THE INVENTION

Embodiments of the present invention are described below with reference to the drawing. However, the present invention is not limited to these embodiments.

A. Heat Exchange Member

A-1. Overall Configuration of Heat Exchange Member

Figure 1:
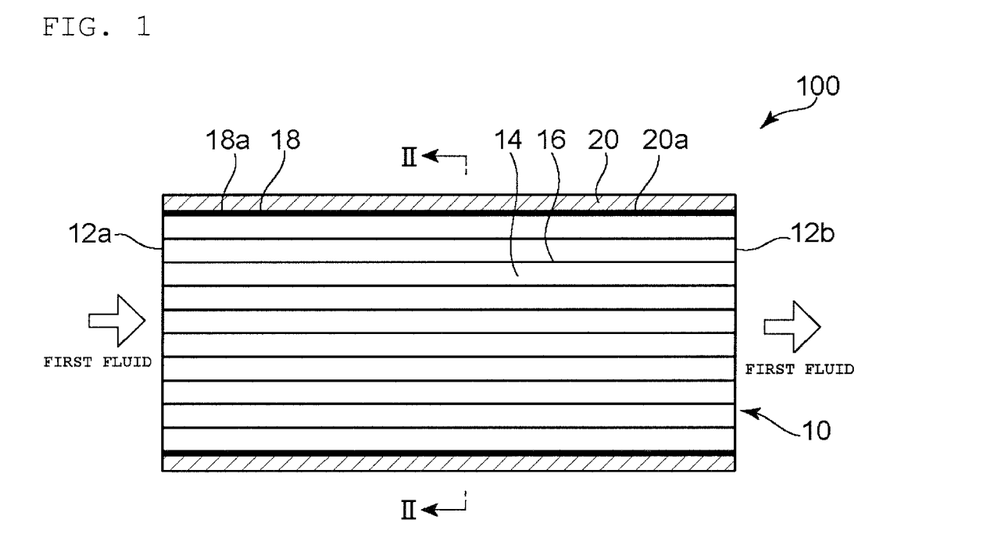
FIG. 1 is a schematic sectional view of a heat exchange member according to one embodiment of the present invention, which is taken in a direction parallel to a direction in which flow passages for a first fluid extend.
Figure 2:
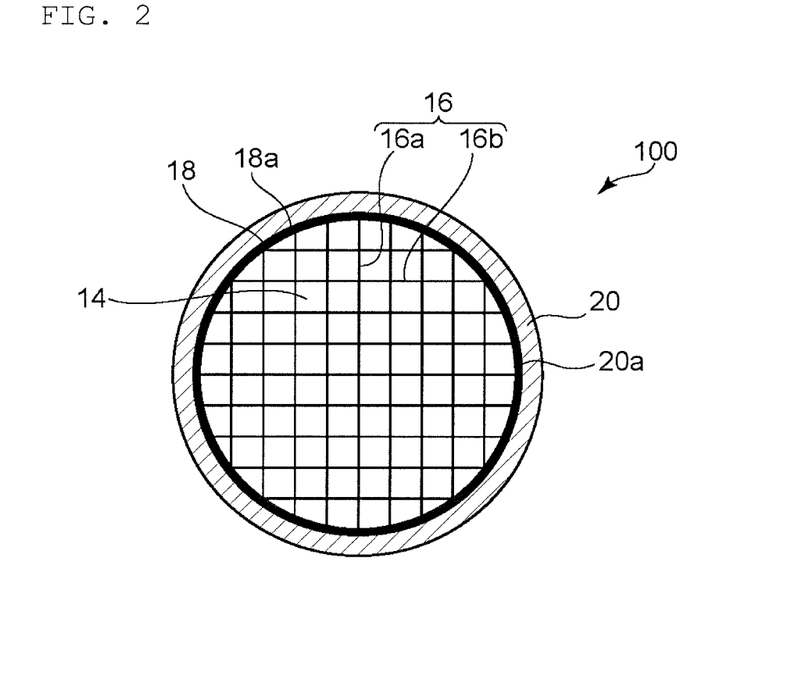
FIG. 2 is a schematic sectional view of the heat exchange member according to one embodiment of the present invention, which is taken in a direction orthogonal to the direction in which the flow passages for the first fluid extend (schematic sectional view taken along the line II-II of FIG. 1).

FIG. 1 is a schematic sectional view of a heat exchange member according to one embodiment of the present invention, which is taken in a direction parallel to a direction in which flow passages for a first fluid extend. FIG. 2 is a schematic sectional view of the heat exchange member of FIG. 1, which is taken along the line II-II. A heat exchange member 100 of the illustrated example includes a honeycomb structure body 10 and a covering member 20. The honeycomb structure body 10 includes partition walls 16 and an outer peripheral wall 18. The partition walls 16 extend from a first end surface 12a to a second end surface 12b to define cells 14 forming flow passages for a first fluid. The covering member 20 covers the outer peripheral wall 18 of the honeycomb structure body 10. The partition walls 16 and the outer peripheral wall 18 contain ceramic as a main component.

In the embodiment of the present invention, a peak count RPc of an outer peripheral wall surface (outer peripheral surface of the outer peripheral wall) 18a according to JIS B 0601:2013 is set to 55 pks/cm or larger, preferably 75 pks/cm or larger, more preferably 80 pks/cm or larger, and further preferably 90 pks/cm or larger. An upper limit of the peak count RPc may be, for example, 115 pks/cm. When the peak count RPc of the outer peripheral wall surface is set to fall within the above-mentioned range, excellent heat exchange performance can be achieved. It is estimated that such an effect can be achieved as follows. However, the following description is based on a mere estimation, and does not restrict actions, effects, and a mechanism according to the embodiment of the present invention. The peak count RPc is one of indices of surface roughness, and indicates the number of peaks within a reference range. When the peak count RPc is set to the predetermined value or larger as described above, the number of reliable contact points between the outer peripheral wall surface 18a of the honeycomb structure body 10 and an inner peripheral surface 20a of the covering member 20 becomes larger. An increase in the number of contact points improves heat transfer from the outer peripheral wall to the covering member. Thus, the heat exchange member with improved heat exchange performance can be obtained. Further, as described later, in the embodiment of the present invention, both of a maximum height of profile Rt and an arithmetic average roughness Ra representatively have values equal to or smaller than predetermined values, respectively. Specifically, the number of peaks on the outer peripheral wall surface of the honeycomb structure body is large. However, the peaks do not include a prominently high peak. In addition, the outer peripheral wall surface is not significantly rough as a whole. As a result, the outer peripheral wall surface 18a of the honeycomb structure body 10 and the inner peripheral surface 20a of the covering member 20 are in reliable contact with each other through intermediation of a large number of contact points. In addition, an area of contact as a whole (specifically, between the entire surfaces) also increases. Thus, according to the embodiment of the present invention, the heat transfer between (the outer peripheral wall surface of) the honeycomb structure body and (the inner peripheral surface of) the covering member is improved. As a result, the heat exchange member having excellent heat exchange performance can be obtained.

A peak count RPc of the inner peripheral surface 20a of the covering member 20 is preferably set to 45 pks/cm or larger, more preferably 80 pks/cm or larger, and further preferably 120 pks/cm or larger. An upper limit of the peak count RPc may be, for example, 150 pks/cm. When the peak count RPc of the inner peripheral surface of the covering member is set to fall within the above-mentioned range, more excellent heat exchange performance can be achieved by the combination with an effect obtained by setting the peak count RPc of the outer peripheral wall surface within the above-mentioned range.

A maximum height of profile (sum of a maximum value of a peak height and a maximum value of a valley depth) Rt of the outer peripheral wall surface 18a according to JIS B 0601:2013 is preferably set to 75 μm or smaller, more preferably 55 μm or smaller, and more preferably 45 μm or smaller. A lower limit of the maximum height of profile Rt is not limited to a particular value, and may be, for example, 10 μm. When the maximum height of profile Rt of the outer peripheral wall surface is set to fall within the above-mentioned range, more excellent heat exchange performance can be achieved by the combination with the effect obtained by setting the peak count RPc of the outer peripheral wall surface within the above-mentioned range. The reason therefor is estimated as follows. (As in the case of the peak count RPc, however, the following estimation does not restrict the actions, the effects, and the mechanism according to the embodiment of the present invention.) When the maximum height of profile is excessively large, the number of contact points may be reduced due to such a maximum height even with the peak count RPc (specifically, the number of peaks) set to the predetermined value or larger. Thus, when the maximum height of profile is set equal to or smaller than the predetermined value, the number of reliable contact points can be ensured by setting the peak count RPc to the predetermined value or larger. Further, contact as a whole between the outer peripheral wall surface of the honeycomb structure body and the inner peripheral surface of the covering member can be ensured. Further, the honeycomb structure body having the outer peripheral wall surface with both of the maximum height of profile Rt and the peak count RPc as described above can be formed by a manufacturing method described later in Section B.

The arithmetic average roughness Ra of the outer peripheral wall surface 18a according to JIS B 0601:2013 is preferably set to 9.5 μm or smaller, more preferably 7.5 μm or smaller, and further preferably 4.5 μm or smaller. A lower limit of the arithmetic average roughness Ra is not limited to a particular value, and may be, for example, 0.5 μm. When the arithmetic average roughness Ra of the outer peripheral wall surface is set to fall within the above-mentioned range, more excellent heat exchange performance can be achieved by the combination with the effects of setting the peak count RPc and the maximum height of profile Rt of the outer peripheral wall surface within the above-mentioned ranges. Specifically, while the number of reliable contact points is large between the peaks on the outer peripheral wall surface of the honeycomb structure body and the inner peripheral surface of the covering member, an area of contact as a whole (specifically, between the entire surfaces) can also be increased. As a result, the heat transfer between (the outer peripheral wall surface of) the honeycomb structure body and (the inner peripheral surface of) the covering member can be improved.

Now, the honeycomb structure body and the covering member of the heat exchange member are described.

A-2. Honeycomb Structure Body

As illustrated in FIG. 1 and FIG. 2, the honeycomb structure body 10 includes the partition walls 16 and the outer peripheral wall 18. The partition walls 16 extend from the first end surface 12a to the second end surface 12b to define the cells 14 forming the flow passages for the first fluid. When the first fluid flows through the cells 14 of the honeycomb structure body 10 and a second fluid flows outside the covering member 20 (described later) in the heat exchange member 100, heat is exchanged between the first fluid and the second fluid through intermediation of the outer peripheral wall 18 of the honeycomb structure body 10 and the covering member 20. In FIG. 1, the first fluid is allowed to flow in any of a rightward direction and a leftward direction in the drawing sheet of FIG. 1. As the first fluid, any appropriate liquid or gas suited for a purpose of use is given. For example, when the heat exchange member 100 is used for a heat exchanger to be mounted in an automobile, the first fluid is preferably an exhaust gas.

Any appropriate shape may be used as a sectional shape of the honeycomb structure body 10, which is taken in a direction orthogonal to a direction in which the flow passages for the first fluid extend, as long as the first fluid flows through the cells 14 from the first end surface 12a to the second end surface 12b. Specific examples of the sectional shape include a circular shape, an ellipsoidal shape, a rectangular shape, and other polygonal shapes. In one embodiment, the honeycomb structure body 10 may have a columnar shape and a circular sectional shape.

Each of the cells 14 has any appropriate sectional shape taken in the direction orthogonal to the direction in which the flow passages for the first fluid extend. In the illustrated example, first partition walls 16a and second partition walls 16b are orthogonal to each other to define the cells 14, each having a rectangular (square) sectional shape except for parts in contact with the outer peripheral wall 18. The sectional shape of each of the cells 14 may be not only square but also triangular, pentagonal, or polygonal with six or more sides. In another embodiment (not shown), the cells may be defined by first partition walls extending in a radial direction from a center of a cross section orthogonal to the direction in which the flow passages for the first fluid extend and second partition walls extending in the circumferential direction. All the cells may have the same sectional shape and size (except for parts in contact with the outer peripheral wall), or at least some of the cells may have different sectional shape and size.

A thickness of each of the partition walls 16 may be appropriately set in accordance with a purpose of use. The thickness of each of the partition walls 16 may be set to fall within a range of, for example, from 0.1 mm to 1.0 mm, or, for example, from 0.2 mm to 0.6 mm. When the thickness of each of the partition walls is set to fall within the above-mentioned range, the honeycomb structure body having sufficient mechanical strength can be obtained. In addition, a sufficient opening area (total area of the cells in the cross section) can be obtained.

A density of the partition walls 16 can be appropriately set in accordance with a purpose of use. The density of the partition walls 16 may be set to fall within a range of, for example, from 0.5 g/cm$^3$ to 5.0 g/cm$^3$. When the density of the partition walls is set to fall within the above-mentioned range, the honeycomb structure body and, in turn, the heat exchange member can be reduced in weight. In addition, sufficient mechanical strength and heat conductivity can be obtained. The density can be measured by, for example, the Archimedes method.

In one embodiment, a thickness of the outer peripheral wall 18 is set larger than the thickness of each of the partition walls 16. Such a configuration can prevent the outer peripheral wall from being damaged (for example, being cracked or broken) by an external force, for example, an impact applied from an outside or a thermal stress caused by a temperature difference between the first fluid and the second fluid. When the heat exchange member is used for common heat exchange, the thickness of the outer peripheral wall 18 is set to fall within a range of, for example, from 0.3 mm to 10 mm. Further, the thickness may be set to fall within a range of, for example, from 0.5 mm to 5 mm. When the heat exchange member is used for heat storage, a heat capacity can be increased by setting the thickness of the outer peripheral wall to, for example, 10 mm or larger.

As described above, the partition walls 16 and the outer peripheral wall 18 contain ceramic as a main component. In this specification, the phrase "containing ceramic as a main component" means that a ratio of a mass of ceramic to a total mass of the partition walls 16 and the outer peripheral wall 18 is 50% by mass or larger.

A porosity of the partition walls 16 and the outer peripheral wall 18 is preferably set to 10% or smaller, more preferably 5% or smaller, and further preferably 3% or smaller. The porosity can be set to, for example, 0%. When the porosity of the partition walls and the outer peripheral wall is set to fall within the above-mentioned range, the heat conductivity of the honeycomb structure body can be improved.

Preferably, the partition walls 16 and the outer peripheral wall 18 are made of ceramic containing silicon carbide as a main component. The partition walls 16 and the outer peripheral wall 18 may contain silicon carbide at, for example, a percentage equal to or larger than 50% by mass to a total mass.

Specific examples of silicon carbide include SiC, Si-impregnated SiC, (Si+Al)-impregnated SiC, metal composite SiC, recrystallized SiC, and $Si_3N_4$. Of those, Si-impregnated SiC and (Si+Al)-impregnated SiC are preferred. These silicon carbides are used because these silicon carbides are inexpensive and highly thermally conductive. In this specification, for example, the term "SiC" is intended to include not only pure SiC but also SiCs containing an inevitable impurity.

A cell density (specifically, the number of cells 14 per unit area) in the cross section of FIG. 2 can be appropriately set in accordance with a purpose of use. The cell density may be set to fall within a range of, for example, from 4 cells/cm$^2$ to 320 cells/cm$^2$. When the cell density is set to fall within the above-mentioned range, sufficient strength and effective geometric surface area (GSA) of the honeycomb structure body can be ensured. At the same time, pressure loss, which may be generated when the first fluid flows, can be eliminated or reduced.

Figure 3:
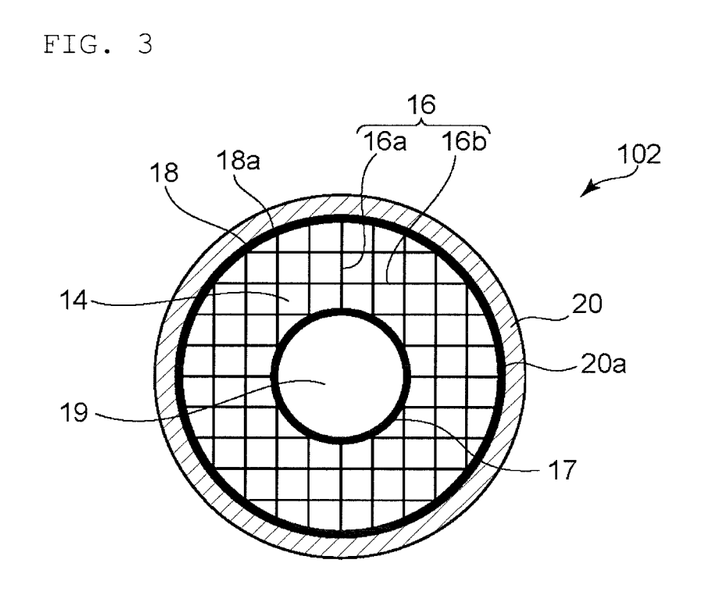
FIG. 3 is a schematic sectional view of a heat exchange member according to another embodiment of the present invention, which is taken in the direction orthogonal to the direction in which the flow passages for a first fluid extend.

As illustrated in FIG. 2, the cells 14 of the honeycomb structure body 10 may be arranged without any space inside the outer peripheral wall 18 when the honeycomb structure body 10 is viewed in cross section perpendicular to the direction in which the flow passages for the first fluid extend. As illustrated in FIG. 3, the honeycomb structure body 10 may have a hollow region 19 in a center of the cross section. When the honeycomb structure body has the hollow region, the hollow region may function as a bypass for the first fluid. Such a configuration can achieve the heat exchange member and, in turn, the heat exchanger having both of high heat recovery performance and high heat shielding performance. When the honeycomb structure body has the hollow region, the honeycomb structure body includes the outer peripheral wall 18, an inner peripheral wall 17, and the partition walls 16. The partition walls 16 are disposed between the outer peripheral wall 18 and the inner peripheral wall 17, and extend from the first end surface 12a to the second end surface 12b to define a plurality of cells 14 serving as the flow passages for the first fluid. When the honeycomb structure body has the hollow region, the hollow region may have any appropriate shape. Specific examples thereof include a circular shape, an ellipsoidal shape, a rectangular shape, and other polygonal shapes. The shape of the hollow region may be the same as or different from the shape of the honeycomb structure body. Preferably, the shape of the honeycomb structure body is the same as that of the honeycomb structure body, as illustrated in FIG. 3. Such a configuration provides high durability against, for example, an impact applied from the outside and a thermal stress caused by a temperature difference between the first fluid and the second fluid. Further, a diameter of the inner peripheral wall in its cross section orthogonal to the direction in which the flow passages for the first fluid extend is preferably set to fall within a range of from 1 mm to 100 mm, and more preferably from 2 mm to 70 mm. When a sectional shape of the inner peripheral wall is not circular, a diameter of a maximum inscribed circle in the sectional shape of the inner peripheral wall is regarded and used as the diameter of the inner peripheral wall. A configuration of the inner peripheral wall is the same as those of the outer peripheral wall and the partition walls described above. A thickness of the inner peripheral wall may be the same as the thickness of the outer peripheral wall.

Isostatic strength of the honeycomb structure body is preferably set to 5 MPa or larger, more preferably 10 MPa or larger, and further preferably 100 MPa or larger. Such a configuration allows the honeycomb structure body to have excellent durability. The isostatic strength can be measured in accordance with JASO standards M505-87, which are automobile standards issued by the Society of Automotive Engineers of Japan, Inc.

A diameter of the honeycomb structure body in the cross section of FIG. 2 may be appropriately set in accordance with a purpose of use. The diameter of the honeycomb structure body may be set to fall within a range of, for example, from 20 mm to 200 mm, or from 30 mm to 100 mm. When the diameter of the honeycomb structure body is set to fall within the above-mentioned range, heat recovery efficiency can be improved. When the sectional shape of the honeycomb structure body is not circular, a diameter of a maximum inscribed circle in a sectional shape (for example, a polygonal shape) of the honeycomb structure body can be regarded and used as the diameter of the honeycomb structure body.

A length of the honeycomb structure body may be appropriately set in accordance with a purpose of use. The length of the honeycomb structure body may be set to fall within a range of, for example, from 3 mm to 200 mm, from 5 mm to 100 mm, or from 10 mm to 50 mm.

A heat conductivity of the honeycomb structure body at 25° C. is preferably set to 50 W/(m·K) or larger, more preferably within a range of from 100 W/(m·K) to 300 W/(m·K), and further preferably within a range of from 120 W/(m·K) to 300 W/(m·K). When the honeycomb structure body has a heat conductivity set to fall within the above-mentioned range, a heat conducting property is improved. As a result, heat in the honeycomb structure body (substantially, heat of the first fluid) can efficiently be transferred to the outside (for example, to the second fluid). The heat conductivity can be measured according to JIS R 1611-1997 (laser flash method).

When an exhaust gas is caused to flow through the cells 14 as the first fluid, the partition walls 16 may support a catalyst. When the partition walls 16 support a catalyst, CO, NO$_x$, hydrocarbon, or other compounds in the exhaust gas can be turned into a harmless substance through a catalytic reaction. At the same time, heat of reaction, which is generated when a catalytic reaction occurs, can be used for heat exchange. The catalyst may include, for example, precious metals (e.g., platinum, rhodium, palladium, ruthenium, indium, silver, and gold), aluminum, nickel, zirconium, titanium, cerium, cobalt, manganese, zinc, copper, tin, iron, niobium, magnesium, lanthanum, samarium, bismuth, barium, and combinations thereof. Those elements may each be included as an elementary metal, a metal oxide, or other metal compounds.

A-3. Covering Member

Any appropriate component may be used as the covering member 20 as long as the component can cover the outer peripheral wall 18 of the honeycomb structure body 10. As the covering member 20, for example, a tubular member may be used. The tubular member is fitted over the outer peripheral wall 18 of the honeycomb structure body 10 to cover the outer peripheral wall 18 of the honeycomb structure body 10 in the circumferential direction. In this specification, the term "fit" refers to, in fitting between the honeycomb structure body and the covering member, not only a fixed state achieved by fitting such as clearance fit, interference fit, or shrink fit, but also a fixed state achieved by, for example, brazing, welding, or diffusion bonding.

The covering member 20 can have an inner surface shape corresponding to a shape of the outer peripheral wall 18 of the honeycomb structure body 10. When the inner peripheral surface of the covering member 20 is brought into direct contact with the outer peripheral wall 18 of the honeycomb structure body 10 and the peak count RPc of the outer peripheral wall surface of the honeycomb structure body and/or the peak count RPc of the inner peripheral surface of the covering member is/are set to fall within the range described above in Section A-1, an extremely high heat transfer property is obtained. Hence, heat in the honeycomb structure body (substantially, heat of the first fluid) can extremely efficiently be transferred to the covering member.

A higher ratio of an area of a part of the outer peripheral wall 18 of the honeycomb structure body 10, which is covered with the covering member 20 in the circumferential direction, to a total area of the outer peripheral wall 18 of the honeycomb structure body 10 is more preferred. Such a configuration can increase the heat recovery efficiency. The ratio of the areas is preferably set to 80% or larger, more preferably 90% or larger, and further preferably 100%. Specifically, the entire outer peripheral wall 18 of the honeycomb structure body 10 is covered with the covering member 20 in the circumferential direction. The phrase "area of the outer peripheral wall 18" refers to an area in parallel to the direction in which the flow passages for the first fluid extend, and does not contain areas of the first end surface and the second end surface.

The covering member 20 is preferably made of a metal. Such a configuration provides excellent manufacturing efficiency. In addition, when the heat exchanger described later is manufactured, mounting (for example, welding) to an outer cylinder (casing) is easy. As a material for forming the covering member, there are given, for example, stainless steel, a titanium alloy, a copper alloy, an aluminum alloy, and brass. Of those, stainless steel is preferred because of having high endurance reliability and being inexpensive.

A thickness of the covering member 20 may be set to fall within a range of, for example, from 0.1 mm to 10 mm, from 0.3 mm to 5 mm, or from 0.5 mm to 3 mm. When the thickness of the covering member is set to fall within the above-mentioned range, an excellent balance between endurance reliability and the heat conducting property can be achieved.

A length of the covering member 20 may be appropriately set in accordance with, for example, a purpose of use or the length of the honeycomb structure body 10. The length of the covering member may be set to fall within a range of, for example, from 5 mm to 250 mm, from 10 mm to 150 mm, or from 20 mm to 100 mm. Preferably, the length of the covering member 20 is set larger than the length of the honeycomb structure body 10. In this case, the honeycomb structure body may be arranged in a center of the covering member, specifically, so as not to be exposed from the covering member.

B. Method of Manufacturing Heat Exchange Member

A method of manufacturing a heat exchange member according to the embodiment of the present invention includes cutting the outer peripheral wall surface of the honeycomb structure body (substantially, a precursor thereof) at a circumferential speed of 3.0 m/second or higher with use of a grindstone having a grit size of 90 or finer and a diameter of 20 mm or larger. The manufacturing method described above allows the honeycomb structure body 10 to have the outer peripheral wall surface 18a having the peak count RPc described above in Section A-1. The inner peripheral surface of the covering member may be additionally cut as needed. As a result of the additional cutting, the inner peripheral surface 20a having the peak count RPc described above in Section A-1 can be formed.

The peak count RPc can be adjusted by appropriately changing a combination of the grit size, the diameter, and the circumferential speed of the grindstone. For example, when the grindstone has a small diameter and a coarse grit size, the outer peripheral wall surface 18a having a desired peak count RPc can be formed by increasing the number of revolutions. Further, for example, when the grindstone having a large diameter is used, the outer peripheral wall surface 18a having a desired peak count RPc can be formed with a finer grit size and a smaller number of revolutions.

More specifically, when the grindstone has a grit size falling within a range of, for example, from 90 to 140 and has a diameter falling within a range of, for example, from 20 mm to 100 mm, preferably, 20 mm to 60 mm, the number of revolutions of the grindstone is preferably set to 3,000 rpm or higher, more preferably set to fall within a range of from 4,000 rpm to 7,000 rpm. In this case, the circumferential speed of the grindstone falls within a range of, for example, from 3 m/second to 15 m/second. When the grindstone has a grit size of, for example, 100 or finer, preferably 120 or finer, and a diameter of 150 mm or larger, preferably falling within a range of from 200 mm to 400 mm, the number of revolutions of the grindstone is preferably set to 3,000 rpm or lower, more preferably, to fall within a range of from 1,200 rpm to 2,000 rpm. In this case, the circumferential speed of the grindstone falls within a range of, for example, from 20 m/second to 35 m/second. In any of the cases, a cutting depth of the grindstone falls within a range of, for example, from 0.1 mm to 0.4 mm.

Preferably, cutting with a grindstone is conducted while a workpiece (substantially, a precursor of the honeycomb structure body), which is a target to be cut, is being rotated. The number of revolutions of the workpiece is set to fall within a range of, for example, from 100 rpm to 500 rpm, and preferably from 150 rpm to 300 rpm.

The honeycomb structure body can be formed by the following method. First, clay containing ceramic powder is formed into a desired shape by extrusion molding to thereby form a honeycomb molded body. As a forming material of the honeycomb molded body, the ceramic described above in Section A-2 can be used. For example, when a honeycomb structure body made of a Si-impregnated SiC composite material as a main component is to be formed, a binder and water or an organic solvent are added to a predetermined amount of SiC powder. The resultant mixture is kneaded into clay. The clay is formed into a honeycomb molded body having a desired shape. Subsequently, the thus obtained honeycomb molded body is dried and processed to have a predetermined outer dimension to thereby obtain a honeycomb dried body. The honeycomb dried body is then impregnated with a metal Si and fired in an inert gas at a reduced pressure or in vacuum. As a result, a honeycomb structure body is obtained. The cutting with a grindstone may be conducted before or after firing (drying and dimension processing).

C. Heat Exchanger

Figure 4:
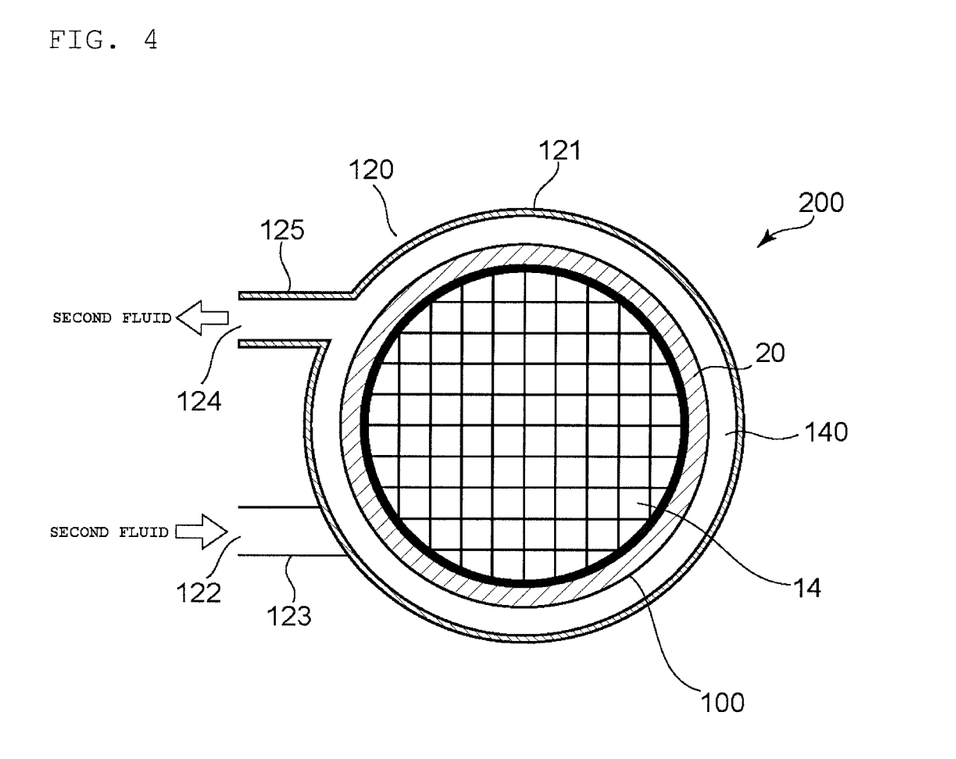
FIG. 4 is a schematic sectional view of a heat exchanger according to one embodiment of the present invention, which is taken in the direction orthogonal to the direction in which the flow passages for the first fluid extend.

FIG. 4 is a schematic sectional view of a heat exchanger according to one embodiment of the present invention, which is taken in the direction orthogonal to the direction in which the flow passages for the first fluid extend. A heat exchanger 200 of the illustrated example includes the heat exchange member 100 illustrated in FIG. 1 and FIG. 2 and an outer cylinder (casing) 120. The outer cylinder 120 is provided on an outer side of the heat exchange member 100 so as to be apart therefrom. A flow passage 140 for the second fluid is defined between the outer cylinder (casing) 120 and the covering member 20 of the heat exchange member 100. In the illustrated example, the heat exchange member 100 illustrated in FIG. 1 and FIG. 2 is used. However, any appropriate heat exchange member according to the embodiment of the present invention, which has been described in Sections A and B, can be used as the heat exchange member. For example, a heat exchange member 102 illustrated in FIG. 3 may be used.

The outer cylinder 120 has a cylindrical portion 121. Representatively, the cylindrical portion 121 covers the covering member 20 in the circumferential direction, preferably covers the entire heat exchange member 100 in the circumferential direction. The outer cylinder 120 has an inlet 122 for the second fluid, an inlet conduit 123, an outlet 124 for the second fluid, and an outlet conduit 125. The inlet conduit 123 couples the inlet 122 and the cylindrical portion 121 to each other. The outlet conduit 125 couples the outlet 124 and the cylindrical portion 121 to each other. The second fluid flows into the inlet 122, passes through the inlet conduit 123, and flows into the flow passage 140. Next, the second fluid exchanges heat with the first fluid flowing through the cells 14 of the heat exchange member 100 while flowing through the flow passage 140, passes through the outlet conduit 125, and flows out from the outlet 124. As the second fluid, any appropriate fluid suited for a purpose of use can be used. For example, when the heat exchanger is to be mounted in an automobile, the second fluid is preferably water or an antifreeze liquid (long life coolant (LLC) defined in JIS K 2234:2006). A temperature of the second fluid is preferably set lower than a temperature of the first fluid. The temperatures are set as described above for the following reason. With the temperatures described above, the covering member 20 of the heat exchange member 100 has a low temperature and does not expand, and the honeycomb structure body 10 has a high temperature and thus expands. As a result, the covering member 20 and the heat exchange member 100 are firmly fitted together.

Preferably, the outer peripheral surface of the covering member 20 at both ends in the direction in which the flow passages for the first fluid extend is in close contact with an inner surface of the outer cylinder 120 in the circumferential direction. Such a configuration can prevent the second fluid from leaking to the outside. The close contact can be achieved by any appropriate means. Specific examples thereof include welding, diffusion bonding, brazing, and mechanical fastening. Welding is preferred because it provides high endurance reliability and achieves improvement in structural strength.

The outer cylinder 120 is preferably made of a metal. Such a configuration can provide both of excellent manufacturing efficiency and an excellent heat conducting property. Examples of the material of the outer cylinder include, for example, stainless steel, a titanium alloy, a copper alloy, an aluminum alloy, and brass. Among them, stainless steel is preferred for its high endurance reliability and inexpensiveness.

A thickness of the outer cylinder 120 is set to fall within a range of, for example, from 0.1 mm to 10 mm, from 0.5 mm to 5 mm, or from 1 mm to 3 mm. When the thickness of the outer cylinder is set to fall within the above-mentioned range, the outer cylinder having excellent endurance reliability, low cost, and an excellent balance between a volume and a weight is obtained.

The outer cylinder 120 may be an integrally molded component or a joined member obtained by joining two or more members. When the outer cylinder 120 is a joined member, a degree of freedom in design of the outer cylinder can be increased.

EXAMPLES

Now, the present invention is specifically described by way of Examples. However, the present invention is not limited by these Examples. Evaluation items in Examples are as described below.

(1) RPc, Ra, and Rt

Parameters RPc, Rt, and Ra of each of outer peripheral wall surfaces of honeycomb structure bodies formed for Examples and Comparative Examples were measured with use of a surface roughness measurement machine (product name "Form Talysurf S5K" manufactured by Taylor Hobson Ltd.). The measurements were conducted with n=2, and average values were obtained as the parameters RPc, Ra, and Rt, respectively.

(2) Heat Exchange Tests

Heat exchange tests were conducted on heat exchangers obtained as Examples and Comparative Examples by the following method. Air (first fluid) at 400° C. (=Tg1) was caused to flow through the honeycomb structure body at a flow rate of 10 g/second (Mg). Meanwhile, cooling water (second fluid) at 40° C. (=Tg2) was supplied from an inlet at a flow rate of 10 L/minute (Mw), and the cooling water having been subjected to heat exchange was recovered from an outlet. Immediately after five-minute passage of the air and the cooling water through the heat exchanger, a temperature (Tw1) of the cooling water at the inlet of the heat exchanger and a temperature (Tw2) of the cooling water at the outlet of the heat exchanger were measured to obtain a heat recovery amount Q. The measurements were conducted with n=2, and an average value was obtained as a heat recovery efficiency.

Herein, the heat amount Q recovered by the cooling water is represented by the following formula.

$$Q \text{ (kW)} = \Delta Tw \text{ (K)} \times Cpw \text{ (J/(kg·K))} \times Pw \text{ (kg/m}^3\text{)} \times Mw \text{ (L/min)}/(60 \times 10^6)$$

In the formula, the $\Delta Tw$, the $Cpw$ (specific heat of water), and the $Pw$ (density of water) were set to $Tw2-Tw1$, 4,182 J/(kg·K), and 997 kg/m³, respectively.

In addition, the heat recovery efficiency η by the heat exchanger is represented by the following formula.

$$\eta(\%) = Q/\{(Tg1-Tw1) \times Cpg \times Mg\} \times 100$$

In the formula, the $Cpg$ (specific heat of air) was set to 1,050 J/(kg·K).

Example 1

1. Formation of Honeycomb Structure Body

After clay containing SiC powder was extruded into a shape with a cross section as illustrated in FIG. 3 as a final shape, the thus formed clay was dried and processed to have a predetermined outer dimension. In this manner, a honeycomb dried body was obtained. An outer peripheral wall surface of the obtained honeycomb dried body was cut with use of a machining center. A grindstone of the machining center had a grit size of 90 and a diameter of 20 mm, was rotated at the number of revolutions of 3,000 rpm and a circumferential speed of 3.1 m/second, and had a cutting depth of 0.2 mm. The honeycomb molded body obtained by cutting the outer peripheral wall surface was impregnated with Si and fired to thereby form a honeycomb structure body having a columnar shape. An outer peripheral wall surface of the thus obtained honeycomb structure body had a peak count RPc of 55.4 pks/cm, an arithmetic average roughness Ra of 9.12 μm, and a maximum height of profile Rt of 73.5 μm. The honeycomb structure body had an outer peripheral wall with a diameter of 75 mm, an inner peripheral wall with a diameter of 57 mm, and a length of 33 mm in a direction in which cells extend. The honeycomb structure body had a so-called donut-like shape with a hollow region in a center in its cross section orthogonal to an axial direction (direction in which the cells extend) of the honeycomb structure body, as illustrated in FIG. 3. A shape of the cell in the cross section orthogonal to the axial direction (direction in which the cells extend) of the honeycomb structure body was rectangular. The honeycomb structure body had a cell density of 57 cells/cm$^2$, partition walls each with a thickness of 0.3 mm, and the outer peripheral wall and the inner peripheral wall each with a thickness of 1.5 mm.

2. Formation of Heat Exchange Member

A tubular member made of stainless steel was used as a covering member. The honeycomb structure body obtained as described above was inserted into the tubular member, which had been heated and expanded, so as to reach a center of the tubular member. After that, the tubular member was cooled so as to shrink. In this manner, the inner peripheral surface of the covering member was fitted over the outer peripheral surface of the honeycomb structure body by shrink fit for fixing the honeycomb structure body inside the covering member. As a result, a heat exchange member was formed. The inner peripheral surface of the covering member had a peak count RPc of 130 pks/cm.

3. Formation of Heat Exchanger

A casing (outer cylinder) made of stainless steel with a cylindrical shape as illustrated in FIG. 4 was formed by die molding. The casing had a cylindrical portion, an inlet, an inlet conduit that couples the inlet and the cylindrical portion to each other, an outlet, and an outlet conduit that couples the outlet and the cylindrical portion to each other. The heat exchange member obtained as described above was inserted into the outer cylinder, and was fixed inside the outer cylinder by welding so that the entire heat exchange member was covered with the outer cylinder in the circumferential direction. An outer peripheral side surface of the honeycomb structure body at both ends in the axial direction (direction in which the cells extend) was brought into close contact with an inner side surface of the outer cylinder by welding in the circumferential direction. As a result, a heat exchanger was formed. The thus obtained heat exchanger was evaluated in the test (2). Results are shown in Table 1.

Examples 2 to 4 and Comparative Examples 1 and 2

Honeycomb structure bodies, each having an outer peripheral wall surface with parameters RPc, Ra, and Rt shown in Table 1, were formed in the same manner as that for Example 1 except that the outer peripheral wall surface of each of the honeycomb molded bodies was cut under conditions shown in Table 1. Heat exchange members and heat exchangers were formed in the same manner as that for Example 1 except that the thus obtained honeycomb structure bodies were used. The resultant heat exchangers were evaluated in the same test as that conducted on Example 1. Results are shown in Table 1.

Example 5

A honeycomb structure body having an outer peripheral wall surface with parameters RPc, Ra, and Rt shown in Table 1 was formed in the same manner as that for Example 1 except that a cylindrical grinder was used in place of the machining center, an outer peripheral wall surface of a honeycomb dried body was cut under conditions shown in Table 1, and the honeycomb dried body was rotated at 300 rpm during cutting. A heat exchange member and a heat exchanger were formed in the same manner as that for Example 1 except that the above-mentioned honeycomb structure body was used. The resultant heat exchanger was evaluated in the same test as that conducted on Example 1. Results are shown in Table 1.

Example 6

After clay containing SiC powder was extruded into the same shape as that of Example 1, the extruded clay was dried and processed to have a predetermined outer dimension. Then, the clay was impregnated with Si and fired to thereby obtain a honeycomb fired body. An outer peripheral wall surface of the resultant honeycomb fired body was cut with use of a cylindrical grinder. A grindstone of the cylindrical grinder had a grit size of 170 and a diameter of 350 mm, was rotated at the number of revolutions of 1,800 rpm and a circumferential speed of 33 m/second, and had a cutting depth of 0.2 mm. The honeycomb fired body was rotated at 150 rpm during the cutting. The thus obtained honeycomb structure body had an outer peripheral wall surface with a peak count RPc of 91.4 pks/cm, an arithmetic average roughness Ra of 1.53 μm, and a maximum height of profile Rt of 32.7 μm. In this manner, a honeycomb structure body having a columnar shape was formed. Dimensions and a shape of the obtained honeycomb structure body were the same as those of Example 1. A heat exchange member and a heat exchanger were formed in the same manner as that for Example 1 except that the thus obtained honeycomb structure body was used. The resultant heat exchanger was evaluated in the same test as that conducted on Example 1. Results are shown in Table 1.

TABLE 1

| | Work-piece | Grinding means | Grindstone | | Number of revolutions of grindstone | Circumferential speed of grindstone | Cutting Depth | Number of revolutions of workpiece | Surface roughness | | | Recovery efficiency |
| | | | Grit size | Diameter mm | rpm | m/second | mm | rpm | RPc | Ra | Rt | |
|---|---|---|---|---|---|---|---|---|---|---|---|---|
| Example 1 | Dried body | Machining center | 90 | 20 | 3,000 | 3.1 | 0.2 | — | 55.4 | 9.12 | 73.5 | 70.05 |
| Example 2 | Dried body | Machining center | 100 | 20 | 3,000 | 3.1 | 0.2 | — | 64.7 | 7.75 | 65.1 | 70.49 |
| Comparative Example 1 | Dried body | Machining center | 80 | 20 | 2,000 | 2.1 | 0.2 | — | 45.9 | 9.85 | 80.5 | 69.7 |
| Comparative Example 2 | Dried body | Machining center | 80 | 20 | 3,000 | 3.1 | 0.2 | — | 50.3 | 9.55 | 76.9 | 69.91 |
| Example 3 | Dried body | Machining center | 100 | 40 | 6,000 | 12.6 | 0.2 | — | 88.4 | 4.50 | 48.7 | 71.42 |

TABLE 1-continued

| | Workpiece | Grinding means | Grindstone Grit size | Diameter mm | Number of revolutions of grindstone rpm | Circumferential speed of grindstone m/second | Cutting Depth mm | Number of revolutions of workpiece rpm | Surface roughness RPc | Ra | Rt | Recovery efficiency |
|---|---|---|---|---|---|---|---|---|---|---|---|---|
| Example 4 | Dried body | Machining center | 140 | 20 | 6,000 | 6.3 | 0.2 | — | 85.5 | 4.47 | 45.7 | 71.52 |
| Example 5 | Dried body | Cylindrical grinder | 120 | 250 | 1,770 | 23.2 | 0.3 | 300 | 91.1 | 3.50 | 40.0 | 71.7 |
| Example 6 | Fired body | Cylindrical grinder | 170 | 350 | 1,800 | 33 | 0.2 | 150 | 91.4 | 1.53 | 32.7 | 72.16 |

As is apparent from Table 1, the heat exchangers of Examples of the present invention had significantly increased heat recovery efficiencies as compared to those of Comparative Examples.

INDUSTRIAL APPLICABILITY

The heat exchange member and the heat exchanger according to the embodiments of the present invention are used for any appropriate purpose of use in heat exchange between a heating body (high temperature side) and a heated body (low temperature side). In particular, the heat exchange member and the heat exchanger can suitably be used for heat recovery from an exhaust gas emitted from an automobile.

What is claimed is:

1. A heat exchange member, comprising:
a honeycomb structure body including:
partition walls extending from a first end surface to a second end surface to define cells forming flow passages for a first fluid; and
an outer peripheral wall; and
a covering member configured to cover the outer peripheral wall of the honeycomb structure body,
wherein the partition walls and the outer peripheral wall contain ceramic as a main component, and
wherein the outer peripheral wall surface has a peak count RPc according to the Japanese Industrial Standards for surface texture of JIS B 0601:2013 set to 55 pks/cm or larger.

2. The heat exchange member according to claim 1, wherein the covering member has an inner peripheral surface with a peak count RPc set to 45 pks/cm or larger.

3. The heat exchange member according to claim 1, wherein the outer peripheral wall surface has a maximum height of profile Rt according to the Japanese Industrial Standards for surface texture of JIS B 0601:2013 set to 75 µm or smaller.

4. The heat exchange member according to claim 1, wherein the partition walls and the outer peripheral wall are made of a ceramic containing silicon carbide, wherein the mass ratio of the ceramic containing silicon carbide to a total mass of the partition walls and the outer peripheral wall is 50% by mass or larger.

5. The heat exchange member according to claim 1, wherein the cells of the honeycomb structure body are arranged without any space inside the outer peripheral wall when the honeycomb structure body is viewed in cross section perpendicular to a direction in which the flow passages for the first fluid extend.

6. The heat exchange member according to claim 1, wherein the honeycomb structure body has a hollow region in a center of the cross section perpendicular to a direction in which the flow passages for the first fluid extend.

7. A heat exchanger, comprising:
the heat exchange member of claim 1; and
an outer cylinder provided on an outer side of the heat exchange member so as to be apart from the heat exchange member,
wherein a flow passage for a second fluid is defined between the outer cylinder and the covering member of the heat exchange member.

8. The heat exchange member according to claim 2, wherein the outer peripheral wall surface has a maximum height of profile Rt according to the Japanese Industrial Standards for surface texture of JIS B 0601:2013 set to 75 µm or smaller.

9. The heat exchange member according to claim 2, wherein the partition walls and the outer peripheral wall are made of ceramic containing silicon carbide, wherein the mass ratio of the ceramic containing silicon carbide to a total mass of the partition walls and the outer peripheral wall is 50% by mass or larger.

10. The heat exchange member according to claim 3, wherein the partition walls and the outer peripheral wall are made of ceramic containing silicon carbide, wherein the mass ratio of the ceramic containing silicon carbide to a total mass of the partition walls and the outer peripheral wall is 50% by mass or larger.

11. The heat exchange member according to claim 2, wherein the cells of the honeycomb structure body are arranged without any space inside the outer peripheral wall when the honeycomb structure body is viewed in cross section perpendicular to a direction in which the flow passages for the first fluid extend.

12. The heat exchange member according to claim 3, wherein the cells of the honeycomb structure body are arranged without any space inside the outer peripheral wall when the honeycomb structure body is viewed in cross section perpendicular to a direction in which the flow passages for the first fluid extend.

13. The heat exchange member according to claim 4, wherein the cells of the honeycomb structure body are arranged without any space inside the outer peripheral wall when the honeycomb structure body is viewed in cross section perpendicular to a direction in which the flow passages for the first fluid extend.

14. The heat exchange member according to claim 2, wherein the honeycomb structure body has a hollow region in a center of the cross section perpendicular to a direction in which the flow passages for the first fluid extend.

15. The heat exchange member according to claim 3, wherein the honeycomb structure body has a hollow region in a center of the cross section perpendicular to a direction in which the flow passages for the first fluid extend.

16. The heat exchange member according to claim 4, wherein the honeycomb structure body has a hollow region in a center of the cross section perpendicular to a direction in which the flow passages for the first fluid extend.

17. The heat exchange member according to claim 1, wherein a recovery efficiency of the heat exchange member is greater than or equal to 70.05%.

18. A method of manufacturing a heat exchange member, the method comprising the steps of:
   providing a heat exchange member comprising:
   a honeycomb structure body including:
      partition walls extending from a first end surface to a second end surface to define cells forming flow passages for a first fluid; and
      an outer peripheral wall; and
   a covering member configured to cover the outer peripheral wall of the honeycomb structure body,
      wherein the partition walls and the outer peripheral wall contain ceramic as a main component, and
      wherein the outer peripheral wall surface has a peak count RPc according to the Japanese Industrial Standards for surface texture of JIS B 0601:2013 set to 55 pks/cm or larger; and
   cutting the outer peripheral wall surface at a circumferential speed of 3.0 m/second or higher with use of a grindstone having a grit size of 90 or finer and a diameter of 20 mm or larger.

\* \* \* \* \*